US012779441B2

(12) United States Patent
Sheehan et al.

(10) Patent No.: US 12,779,441 B2
(45) Date of Patent: Nov. 3, 2026

(54) CATALYSTS AND METHODS FOR THE HYDRATION AND ABSORPTION OF CARBON DIOXIDE

(71) Applicant: Air Company Holdings, Inc., Brooklyn, NY (US)

(72) Inventors: Stafford W. Sheehan, Tiverton, RI (US); Chi Chen, Shrewsbury, MA (US)

(73) Assignee: Air Company Holdings, Inc., Brooklyn, NY (US)

( * ) Notice: Subject to any disclaimer, the term of this patent is extended or adjusted under 35 U.S.C. 154(b) by 512 days.

(21) Appl. No.: 18/283,248

(22) PCT Filed: Mar. 23, 2022

(86) PCT No.: PCT/US2022/021469
§ 371 (c)(1),
(2) Date: Sep. 21, 2023

(87) PCT Pub. No.: WO2022/204233
PCT Pub. Date: Sep. 29, 2022

(65) Prior Publication Data

US 2024/0189805 A1 Jun. 13, 2024

Related U.S. Application Data

(60) Provisional application No. 63/164,625, filed on Mar. 23, 2021.

(51) Int. Cl.
*B01J 31/22* (2006.01)
*B01D 53/62* (2006.01)

(52) U.S. Cl.
CPC .......... *B01J 31/2213* (2013.01); *B01D 53/62* (2013.01); *B01D 2251/306* (2013.01); *B01D 2251/606* (2013.01); *B01D 2252/20* (2013.01); *B01D 2255/20792* (2013.01); *B01D 2255/705* (2013.01); *B01D 2257/504* (2013.01)

(58) Field of Classification Search
CPC .. B01D 53/62; B01D 53/96; B01D 2251/306; B01D 2251/606; B01D 2252/20; B01D 2252/204; B01D 2252/30; B01D 2252/602; B01D 2255/20792; B01D 2255/705; B01D 2257/504; B01J 31/2213; B01J 31/2243; B01J 2531/26; C01B 32/50; C07C 55/12; C07C 229/16
See application file for complete search history.

(56) References Cited

U.S. PATENT DOCUMENTS

| | | | | |
|---|---|---|---|---|
| 3,681,416 | A | 8/1972 | Miller et al. | |
| 3,697,466 | A | 10/1972 | Cahill et al. | |
| 3,719,694 | A | 3/1973 | Feiler et al. | |
| 4,399,070 | A | 8/1983 | Wilson | |
| 2005/0109210 | A1 | 5/2005 | Davis et al. | |
| 2008/0039344 | A1 | 2/2008 | Devereux et al. | |
| 2011/0218320 | A1 * | 9/2011 | Steinke | C08G 65/26 528/405 |
| 2012/0199535 | A1 * | 8/2012 | Valdez | C02F 1/20 210/242.1 |
| 2020/0277248 | A1 | 9/2020 | Cronin et al. | |

FOREIGN PATENT DOCUMENTS

| | | | | | |
|---|---|---|---|---|---|
| KR | 20180060647 | A * | 6/2018 | C08G 64/32 |
| WO | WO-2022/204233 | A1 | 9/2022 | |

OTHER PUBLICATIONS

Machine translation of Bang et al (KR1020180060647). (Year: 2018).*

International Search Report and Written Opinion for International Application No. PCT/US22/21469 dated Jun. 10, 2022.

Budkuley et al., "Thermoanalytical properties of monobasic nitrilotriacetate salts of alkaline earth metals and zinc." Thermochimica Acta 320(1-2) (1998): 115-120.

Han et al., "Polymeric membranes for CO2 separation and capture." Journal of Membrane Science 628 (2021): 119244.

Kong et al., "Copper(II) and Zinc(II) Complexes Can Fix Atmospheric Carbon Dioxide." Angew. Chem. 2005, 117 , 4426-4429.

Sivanesan et al., "Enhanced CO2 absorption and desorption in a tertiary amine medium with a carbonic anhydrase mimic." Journal of Industrial and Engineering Chemistry 52 (2017): 287-294.

Supplementary European Search Report for EP Application No. 22776536.9 dated May 27, 2025.

Verdejo et al., "CO2 fixation by Cu2+ and Zn2+ complexes of a terpyridinophane aza receptor. Crystal structures of Cu2+ complexes, pH-metric, spectroscopic, and electrochemical studies." Inorganic Chemistry 45(9) (2006): 3803-3815.

* cited by examiner

*Primary Examiner* — Brian A McCaig

(74) *Attorney, Agent, or Firm* — Foley Hoag LLP; Lucas P. Watkins; Lucas A. Freeman

(57) ABSTRACT

The present disclosure provides catalysts comprising zinc and one or more ligands that improve the hydration of carbon dioxide at a zinc metal center, including but not limited to ethylenediaminetetraacetic acid and its derivatives. In certain embodiments, one or more of the ligands on the zinc is water that is replaced with carbon dioxide. In certain embodiments, the zinc catalyst coordinates an appropriate carbon dioxide adsorption solvent to reduce the activation energy for carbon dioxide hydration. Methods and apparatuses that are designed to efficiently utilize sorbents with improved sorption and desorption characteristics, such as those that include an inorganic catalyst or modified carbonic anhydrase, are also disclosed.

9 Claims, No Drawings

CATALYSTS AND METHODS FOR THE HYDRATION AND ABSORPTION OF CARBON DIOXIDE

RELATED APPLICATIONS

This application is a US National Phase entry under 35 USC § 371 of International Patent Application No. PCT/US2022/021469, filed Mar. 23, 2022; which claims the benefit of priority to U.S. Provisional Patent Application No. 63/164,625, filed Mar. 23, 2021, the contents of each of which are incorporated herein by reference in their entirety.

FIELD OF THE INVENTION

The present disclosure relates to the field of homogeneous and heterogeneous catalysts, specifically for metal complexes that coordinate carbon dioxide from concentrated liquid or gaseous streams or the atmosphere to improve the efficacy of carbon dioxide capture systems.

BACKGROUND OF THE INVENTION

Carbon dioxide capture systems present an opportunity to remove $CO_2$ from the atmosphere at a rate substantially faster than natural systems, toward preventing global climate change. There are social, economic, and energy security advantages toward being able to effectively capture and utilize $CO_2$, and to do so effectively, the technology that captures $CO_2$ must be designed in a cost and energy efficient manner. Accordingly, there is a need for efficient and cost-effective technologies that facilitate the capture and/or transformation of $CO_2$.

SUMMARY OF THE INVENTION

In certain aspects, the present disclosure provides a zinc complex having the formula:

$$(L^1)_nZn(L^2)_m;$$

wherein:
each $L^1$ is a bidentate, tridentate, tetradentate, pentadentate, hexadentate, heptadentate, or octadentate ligand coordinated to Zn in at least a $\kappa^2$ fashion;
each $L^1$ is bound to Zn through at least one donor heteroatom selected from O or N;
each $L^1$ is mono-, di-, tri-, tetra-, penta-, or hexaanionic;
each $L^2$ is selected from —OH or —$OH_2$;
n is 1 or 2; and
m is 0 or 1.

In certain embodiments, the present disclosure provides a complex having the formula:

$$[\{(L^1)_nZn(L^2)_m\}w]^z[A_y]^x$$

wherein:
z is the charge of the $\{(L^1)_nZn(L^2)_m\}$ fragment, and is selected from 0, −1, −2, or −3;
A is a cation;
x is the charge of the A cation, and is selected from +1 or +2;
w is an integer equal to (y·x)/z; and
y is an integer equal to (w·z)/x.

In further embodiments, the present disclosure provides any of the complexes described herein, wherein $L^1$ is a ligand of Formula $L^{1A}$, $L^{1B}$, $L^{1C}$, or $L^{1D}$:

$L^{1A}$

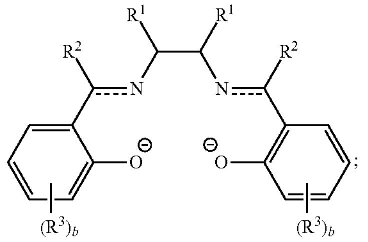

$L^{1B}$

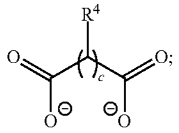

$L^{1C}$

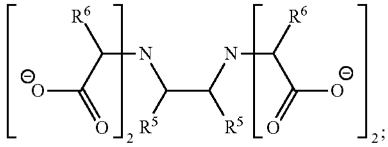

or $L^{1D}$

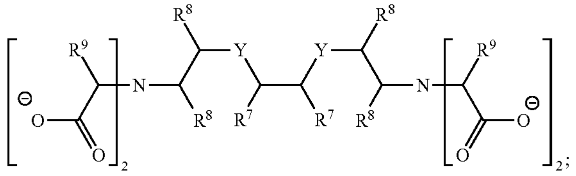

wherein:
each $R^1$, $R^2$, $R^3$, $R^4$, $R^5$, $R^6$, $R^7$, $R^8$, and $R^9$ is, independently at each occurrence, selected from H, OH, amino, imine, sulfate, sulfonyl, alkyl, heteroalkyl, alkoxy, aryl, heteroaryl, cycloalkyl, heterocycloalkyl, acetyl, carboxylate, glycolate;
Y is NH, S, or O;
b is, independently at each occurrence, an integer from 0-4;
c is, independently at each occurrence, an integer from 0-3; and
$\overset{---}{=}$ is a single or double bond.

In further aspects, the present disclosure describes an apparatus for carbon dioxide capture comprising a solution of a zinc complex in water and optionally a co-solvent; wherein the zinc complex comprises at least one ligand coordinated to zinc.

In yet further aspects, the present disclosure describes an apparatus for carbon dioxide capture comprising a solution of a zinc complex in water and optionally a co-solvent; wherein the zinc complex comprises at least one ligand coordinated to zinc.

DETAILED DESCRIPTION OF THE INVENTION

Carbon dioxide capture systems present an opportunity to remove $CO_2$ from the atmosphere at a rate substantially faster than natural systems, toward preventing global climate change. There are social, economic, and energy security advantages toward being able to effectively capture and utilize $CO_2$, and to do so effectively, the technology that captures $CO_2$ must be designed in a cost and energy efficient manner. Among $CO_2$ capture systems, there are two major categories: those that capture $CO_2$ from the air, called direct air capture, and those that capture $CO_2$ from a point source. As with any purification technology, both systems have entropic loss, and thus have minimum thermodynamic free energy requirements.

For example, direct air capture must collect $CO_2$ from the air which has a concentration of approximately 400 ppm. Assuming half the $CO_2$ introduced to a capture module is collected, resulting in a 200 ppm $CO_2$ tail gas, approximately 133 kWh of free energy per metric ton of $CO_2$ is required at ambient temperature. While this number represents the thermodynamic minimum and is not possible to reach due to other inevitable losses in direct air capture systems outside the sorbent, current systems are far from ideal. It is predicted that combined electric and thermal energy requirements for a fully optimized direct air capture system constructed with current off the shelf technology, over 1500 kWh per metric ton of $CO_2$ is required.

$CO_2$ capture, and specifically direct air capture, thus faces two major technical challenges for its widespread use. The first is the high energy cost, which is driven by sorbent-dependent energy requirements to adsorb and desorb $CO_2$, the need for moving mechanical components to move large volumes of air, and other balance of plant. The second is high capital cost for $CO_2$ capture systems, the amortized cost of capital must be competitive with more polluting systems that purify oxygen from the air and combust it with natural gas. This presents a material challenge favoring small and compact systems with minimal balance of plant that optimize $CO_2$ removal from the flue gas or air that is being purified. Improving sorbent uptake of $CO_2$ would help to address both these challenges, by reducing thermal energy requirements for $CO_2$ adsorption and desorption cycles as well as reducing the overall size required for DAC systems and enabling the use of sorbents with lower energy and regeneration requirements than the industry standard monoethanolamine.

Nature already addressed sorbent uptake $CO_2$ capture challenges in biological systems with the enzyme carbonic anhydrase, which catalyzes the hydration of $CO_2$ to bicarbonate. Carbonic anhydrase is one of the fastest enzymes with a second order turnover rate exceeding $10^6$ per mole-second. Their drawback to practical use is their susceptibility to thermal degradation, as they begin to lose activity at around 40° C., and their costly and complex production. Regardless, $CO_2$ capture systems employing carbonic anhydrase have been built and demonstrated on commercial scales, though not with economic operation.

In 1995, Zhang and van Eldik developed zinc 1,4,7,10-tetraazacyclododecane (Zn cyclen) as a functional model of carbonic anhydrase, to attempt to solve the low temperature degradation challenges of nature's $CO_2$ hydration catalyst thus enabling more effective use of carbonate as a $CO_2$ capture sorbent. Through the following decades, these systems were proposed for $CO_2$ capture systems (U.S. Pat. No. 9,259,725B2), as well as tethered derivatives (U.S. Pat. No. 8,877,069B2), but in all cases the central Zn cyclen moiety remained unchanged. These systems failed to produce marketable results in part due to the low activity of Zn cyclen, which has a turnover rate of around $10^3$ per mole-second, as well as the high cost of the cyclen ligand itself.

The Zn cyclen system was developed to mimic the active site of carbonic anhydrase by copying the physical structure of the histidine-coordinated zinc ion central to the enzyme. Its design did not account for orbital mechanics, substrate positioning, steric effects, and other principles of homogeneous catalysis employed in organometallic chemistry. Development of an improved and lower-cost carbonic anhydrase mimic could address the challenges faced by aqueous carbonate capture systems and other systems that have poor kinetics of $CO_2$ absorption and desorption.

The present disclosure describes synthetic catalysts that mimic carbonic anhydrase designed with industrial use in mind while optimizing inner-sphere interactions between the zinc(II) ion, water, carbon dioxide, and the ligand system. A key differentiating aspect of the present disclosure and prior art is the use of ligands that are widely available or derived from widely available materials, enabling cost-effective utilization. Key physiochemical characteristics of carbonic anhydrase are long range hydrophobic-hydrophilic interactions that control hydrogen bonding around the active site, and a long Zn—O bond length of about 3.2 angstroms, making the bound water strongly nucleophilic. When $CO_2$ is present and the effective pH around the active site is raised above the Zn—$OH_2$ $pK_a$ value in carbonic anhydrase, which is about 7, nucleophilic attack to the electron-deficient carbon occurs rapidly, enabling binding and hydration of $CO_2$.

The present disclosure describes a series of catalysts that optimize the rate of nucleophilic attack from water in these systems. The ligand design uses widely available building blocks so that catalyst regeneration is low-cost and feasible at scale, and synthetic methodologies compatible with industrial scale-up techniques. In certain embodiments of the present disclosure, $K_2CO_3$ adsorption solution is used wherein the catalyst is introduced. The sorbent is exposed to $CO_2$, followed by desorption separated by either space or time and driven by a change in free energy. The change in free energy can be brought about by change in temperature, or by a change in chemical potential by controlling other aspects of the system such as hydration. At the surface of the catalyst, a proposed monodentate carbon intermediate promotes rapid uptake of $CO_2$.

A central aspect of the present disclosure is ligand design and the inner coordination sphere of the zinc complex. The ligand must bind to zinc to enable its hydration and dissolution in the $CO_2$ capture sorbent. Ligands include, but are not limited to one or more combinations of monodentate, bidentate, tridentate, tetradentate, pentadentate, hexadentate, heptadentate, and octadentate ligands. Ligands include derivatives of ethylenediaminetetraacetic acid (EDTA), glutaric acid, nitrilotriacetic acid, triazacyclononane, trispyrazolylborate, terpyridine, porphine, corrin, tris(2-aminoethyl) amine, triethylenetetramine, 12-crown-4, 15-crown-5, 16-crown-6, (2,2,2)cryptand, glycine, salen, 2-(pyridine-2-yl)propan-2-ol, niacin, picolinic acid, 2-acetylpyridine, iminodiacetic acid, oxalate, glutaric acid, ethylene glycol-bis (ß-aminoethyl ether)-N,N,N',N'-tetraacetic acid (EGTA), diethylenetriaminepentaacetic acid, ethylenediamine-N,N'-bis(2-hydroxyphenylacetic acid) (EDDHA).

The present disclosure also encompasses use of these zinc catalysts in a sorbent-based carbon dioxide capture system. In these systems, a lean sorbent without dissolved carbon dioxide or carbonate is exposed to a $CO_2$-containing stream, such as flue gas or air. The $CO_2$ is adsorbed from the $CO_2$-containing stream into the sorbent, resulting in a rich sorbent and a clean air stream with a lower concentration of $CO_2$, typically around 5%, 25%, or 50%. The rich sorbent is isolated from the $CO_2$-containing stream by either moving it physically, capillary action through a polymer, diffusion, or blocking the $CO_2$-containing stream as in a swing system. The rich sorbent is then heated or subject to a change in chemical potential, such as hydration, to cause the $CO_2$ to spontaneously, and rapidly, desorb from the sorbent, resulting in a lean sorbent solid or liquid. The zinc catalyst that is an object of the present disclosure is added to the sorbent to reduce the energy requirement for adsorption, desorption, or both, of $CO_2$.

Definitions

Unless otherwise defined herein, scientific and technical terms used in this application shall have the meanings that are commonly understood by those of ordinary skill in the art. Generally, nomenclature used in connection with, and techniques of, chemistry, cell and tissue culture, molecular biology, cell and cancer biology, neurobiology, neurochemistry, virology, immunology, microbiology, pharmacology, genetics and protein and nucleic acid chemistry, described herein, are those well-known and commonly used in the art.

The methods and techniques of the present disclosure are generally performed, unless otherwise indicated, according to conventional methods well known in the art and as described in various general and more specific references that are cited and discussed throughout this specification. See, e.g. "Principles of Neural Science", McGraw-Hill Medical, New York, N.Y. (2000); Motulsky, "Intuitive Biostatistics", Oxford University Press, Inc. (1995); Lodish et al., "Molecular Cell Biology, 4th ed.", W. H. Freeman & Co., New York (2000); Griffiths et al., "Introduction to Genetic Analysis, 7th ed.", W. H. Freeman & Co., N.Y. (1999); and Gilbert et al., "Developmental Biology, 6th ed.", Sinauer Associates, Inc., Sunderland, MA (2000).

Chemistry terms used herein, unless otherwise defined herein, are used according to conventional usage in the art, as exemplified by "The McGraw-Hill Dictionary of Chemical Terms", Parker S., Ed., McGraw-Hill, San Francisco, C.A. (1985).

All of the above, and any other publications, patents and published patent applications referred to in this application are specifically incorporated by reference herein. In case of conflict, the present specification, including its specific definitions, will control.

As used herein, the terms "optional" or "optionally" mean that the subsequently described event or circumstance may occur or may not occur, and that the description includes instances where the event or circumstance occurs as well as instances in which it does not. For example, "optionally substituted alkyl" refers to the alkyl may be substituted as well as where the alkyl is not substituted.

It is understood that substituents and substitution patterns on the compounds of the present invention can be selected by one of ordinary skilled person in the art to result chemically stable compounds which can be readily synthesized by techniques known in the art, as well as those methods set forth below, from readily available starting materials. If a substituent is itself substituted with more than one group, it is understood that these multiple groups may be on the same carbon or on different carbons, so long as a stable structure results.

As used herein, the term "optionally substituted" refers to the replacement of one to six hydrogen radicals in a given structure with the radical of a specified substituent including, but not limited to: hydroxyl, hydroxyalkyl, alkoxy, halogen, alkyl, nitro, silyl, acyl, acyloxy, aryl, cycloalkyl, heterocyclyl, amino, aminoalkyl, cyano, haloalkyl, haloalkoxy, —OCO—$CH_2$—O-alkyl, —OP(O)(O-alkyl)$_2$ or —$CH_2$—OP(O)(O-alkyl)$_2$. Preferably, "optionally substituted" refers to the replacement of one to four hydrogen radicals in a given structure with the substituents mentioned above. More preferably, one to three hydrogen radicals are replaced by the substituents as mentioned above. It is understood that the substituent can be further substituted.

As used herein, the term "alkyl" refers to saturated aliphatic groups, including but not limited to $C_1$-$C_{10}$ straight-chain alkyl groups or $C_1$-$C_{10}$ branched-chain alkyl groups. Preferably, the "alkyl" group refers to $C_1$-$C_6$ straight-chain alkyl groups or $C_1$-$C_6$ branched-chain alkyl groups. Most preferably, the "alkyl" group refers to $C_1$-$C_4$ straight-chain alkyl groups or $C_1$-$C_4$ branched-chain alkyl groups. Examples of "alkyl" include, but are not limited to, methyl, ethyl, 1-propyl, 2-propyl, n-butyl, sec-butyl, tert-butyl, 1-pentyl, 2-pentyl, 3-pentyl, neo-pentyl, 1-hexyl, 2-hexyl, 3-hexyl, 1-heptyl, 2-heptyl, 3-heptyl, 4-heptyl, 1-octyl, 2-octyl, 3-octyl or 4-octyl and the like. The "alkyl" group may be optionally substituted.

The term "acyl" is art-recognized and refers to a group represented by the general formula hydrocarbylC(O)—, preferably alkylC(O)—.

The term "acylamino" is art-recognized and refers to an amino group substituted with an acyl group and may be represented, for example, by the formula hydrocarbylC(O)NH—.

The term "acyloxy" is art-recognized and refers to a group represented by the general formula hydrocarbylC(O)O—, preferably alkylC(O)O—.

The term "alkoxy" refers to an alkyl group having an oxygen attached thereto. Representative alkoxy groups include methoxy, ethoxy, propoxy, tert-butoxy and the like.

The term "alkoxyalkyl" refers to an alkyl group substituted with an alkoxy group and may be represented by the general formula alkyl-O-alkyl.

The term "alkyl" refers to saturated aliphatic groups, including straight-chain alkyl groups, branched-chain alkyl groups, cycloalkyl (alicyclic) groups, alkyl-substituted cycloalkyl groups, and cycloalkyl-substituted alkyl groups. In preferred embodiments, a straight chain or branched chain alkyl has 30 or fewer carbon atoms in its backbone (e.g., $C_1$-$C_{30}$ for straight chains, $C_3$-$C_{30}$ for branched chains), and more preferably 20 or fewer.

Moreover, the term "alkyl" as used throughout the specification, examples, and claims is intended to include both unsubstituted and substituted alkyl groups, the latter of which refers to alkyl moieties having substituents replacing a hydrogen on one or more carbons of the hydrocarbon backbone, including haloalkyl groups such as trifluoromethyl and 2,2,2-trifluoroethyl, etc.

The term "$C_{x-y}$" or "$C_x$-$C_y$", when used in conjunction with a chemical moiety, such as, acyl, acyloxy, alkyl, alkenyl, alkynyl, or alkoxy is meant to include groups that contain from x to y carbons in the chain. $C_0$alkyl indicates a hydrogen where the group is in a terminal position, a bond if internal. A $C_{1-6}$alkyl group, for example, contains from one to six carbon atoms in the chain.

The term "alkylamino", as used herein, refers to an amino group substituted with at least one alkyl group.

The term "alkylthio", as used herein, refers to a thiol group substituted with an alkyl group and may be represented by the general formula alkylS-.

The term "amide", as used herein, refers to a group

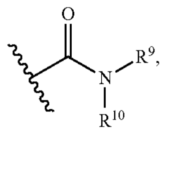

wherein $R^9$ and $R^{10}$ each independently represent a hydrogen or hydrocarbyl group, or $R^9$ and $R^{10}$ taken together with the N atom to which they are attached complete a heterocycle having from 4 to 8 atoms in the ring structure.

The terms "amine" and "amino" are art-recognized and refer to both unsubstituted and substituted amines and salts thereof, e.g., a moiety that can be represented by

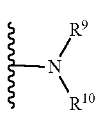
or
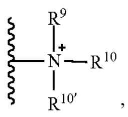
, wherein $R^9$, $R^{10}$, and $R^{10}$, each independently represent a hydrogen or a hydrocarbyl group, or $R^9$ and $R^{10}$ taken together with the N atom to which they are attached complete a heterocycle having from 4 to 8 atoms in the ring structure.

The term "aminoalkyl", as used herein, refers to an alkyl group substituted with an amino group.

The term "aralkyl", as used herein, refers to an alkyl group substituted with an aryl group.

The term "aryl" as used herein include substituted or unsubstituted single-ring aromatic groups in which each atom of the ring is carbon. Preferably the ring is a 5- to 7-membered ring, more preferably a 6-membered ring. The term "aryl" also includes polycyclic ring systems having two or more cyclic rings in which two or more carbons are common to two adjoining rings wherein at least one of the rings is aromatic, e.g., the other cyclic rings can be cycloalkyls, cycloalkenyls, cycloalkynyls, aryls, heteroaryls, and/or heterocyclyls. Aryl groups include benzene, naphthalene, phenanthrene, phenol, aniline, and the like.

The term "carbamate" is art-recognized and refers to a group

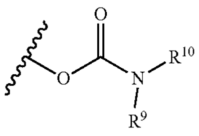
or
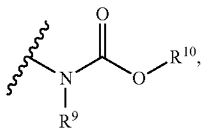
, wherein $R^9$ and $R^{10}$ independently represent hydrogen or a hydrocarbyl group.

The term "carbocyclylalkyl", as used herein, refers to an alkyl group substituted with a carbocycle group.

The term "carbocycle" includes 5-7 membered monocyclic and 8-12 membered bicyclic rings. Each ring of a bicyclic carbocycle may be selected from saturated, unsaturated and aromatic rings. Carbocycle includes bicyclic molecules in which one, two or three or more atoms are shared between the two rings. The term "fused carbocycle" refers to a bicyclic carbocycle in which each of the rings shares two adjacent atoms with the other ring. Each ring of a fused carbocycle may be selected from saturated, unsaturated and aromatic rings. In an exemplary embodiment, an aromatic ring, e.g., phenyl, may be fused to a saturated or unsaturated ring, e.g., cyclohexane, cyclopentane, or cyclohexene. Any combination of saturated, unsaturated and aromatic bicyclic rings, as valence permits, is included in the definition of carbocyclic. Exemplary "carbocycles" include cyclopentane, cyclohexane, bicyclo[2.2.1]heptane, 1,5-cyclooctadiene, 1,2,3,4-tetrahydronaphthalene, bicyclo[4.2.0]oct-3-ene, naphthalene and adamantane. Exemplary fused carbocycles include decalin, naphthalene, 1,2,3,4-tetrahydronaphthalene, bicyclo[4.2.0]octane, 4,5,6,7-tetrahydro-1H-indene and bicyclo[4.1.0]hept-3-ene. "Carbocycles" may be substituted at any one or more positions capable of bearing a hydrogen atom.

The term "carbocyclylalkyl", as used herein, refers to an alkyl group substituted with a carbocycle group.

The term "carbonate" is art-recognized and refers to a group $-OCO_2-$.

The term "carboxy", as used herein, refers to a group represented by the formula $-CO_2H$.

The term "ester", as used herein, refers to a group $-C(O)OR^9$ wherein $R^9$ represents a hydrocarbyl group.

The term "ether", as used herein, refers to a hydrocarbyl group linked through an oxygen to another hydrocarbyl group. Accordingly, an ether substituent of a hydrocarbyl group may be hydrocarbyl-O—. Ethers may be either symmetrical or unsymmetrical. Examples of ethers include, but are not limited to, heterocycle-O-heterocycle and aryl-O-heterocycle. Ethers include "alkoxyalkyl" groups, which may be represented by the general formula alkyl-O-alkyl.

The terms "halo" and "halogen" as used herein means halogen and includes chloro, fluoro, bromo, and iodo.

The terms "hetaralkyl" and "heteroaralkyl", as used herein, refers to an alkyl group substituted with a hetaryl group.

The terms "heteroaryl" and "hetaryl" include substituted or unsubstituted aromatic single ring structures, preferably 5- to 7-membered rings, more preferably 5- to 6-membered rings, whose ring structures include at least one heteroatom, preferably one to four heteroatoms, more preferably one or two heteroatoms. The terms "heteroaryl" and "hetaryl" also include polycyclic ring systems having two or more cyclic rings in which two or more carbons are common to two adjoining rings wherein at least one of the rings is heteroaromatic, e.g., the other cyclic rings can be cycloalkyls, cycloalkenyls, cycloalkynyls, aryls, heteroaryls, and/or heterocyclyls. Heteroaryl groups include, for example, pyrrole, furan, thiophene, imidazole, oxazole, thiazole, pyrazole, pyridine, pyrazine, pyridazine, and pyrimidine, and the like.

The term "heteroatom" as used herein means an atom of any element other than carbon or hydrogen. Preferred heteroatoms are nitrogen, oxygen, and sulfur.

The term "heterocyclylalkyl", as used herein, refers to an alkyl group substituted with a heterocycle group.

The terms "heterocyclyl", "heterocycle", and "heterocyclic" refer to substituted or unsubstituted non-aromatic ring structures, preferably 3- to 10-membered rings, more preferably 3- to 7-membered rings, whose ring structures include at least one heteroatom, preferably one to four heteroatoms, more preferably one or two heteroatoms. The terms "heterocyclyl" and "heterocyclic" also include polycyclic ring systems having two or more cyclic rings in which two or more carbons are common to two adjoining rings wherein at least one of the rings is heterocyclic, e.g., the other cyclic rings can be cycloalkyls, cycloalkenyls, cycloalkynyls, aryls, heteroaryls, and/or heterocyclyls. Heterocyclyl groups include, for example, piperidine, piperazine, pyrrolidine, morpholine, lactones, lactams, and the like.

The term "hydrocarbyl", as used herein, refers to a group that is bonded through a carbon atom that does not have a =O or =S substituent, and typically has at least one carbon-hydrogen bond and a primarily carbon backbone, but may optionally include heteroatoms. Thus, groups like methyl, ethoxyethyl, 2-pyridyl, and even trifluoromethyl are considered to be hydrocarbyl for the purposes of this application, but substituents such as acetyl (which has a =O substituent on the linking carbon) and ethoxy (which is linked through oxygen, not carbon) are not. Hydrocarbyl groups include, but are not limited to aryl, heteroaryl, carbocycle, heterocycle, alkyl, alkenyl, alkynyl, and combinations thereof.

The term "hydroxyalkyl", as used herein, refers to an alkyl group substituted with a hydroxy group.

The term "lower" when used in conjunction with a chemical moiety, such as, acyl, acyloxy, alkyl, alkenyl, alkynyl, or alkoxy is meant to include groups where there are ten or fewer atoms in the substituent, preferably six or fewer. A "lower alkyl", for example, refers to an alkyl group that contains ten or fewer carbon atoms, preferably six or fewer. In certain embodiments, acyl, acyloxy, alkyl, alkenyl, alkynyl, or alkoxy substituents defined herein are respectively lower acyl, lower acyloxy, lower alkyl, lower alkenyl, lower alkynyl, or lower alkoxy, whether they appear alone or in combination with other substituents, such as in the recitations hydroxyalkyl and aralkyl (in which case, for example, the atoms within the aryl group are not counted when counting the carbon atoms in the alkyl substituent).

The terms "polycyclyl", "polycycle", and "polycyclic" refer to two or more rings (e.g., cycloalkyls, cycloalkenyls, cycloalkynyls, aryls, heteroaryls, and/or heterocyclyls) in which two or more atoms are common to two adjoining rings, e.g., the rings are "fused rings". Each of the rings of the polycycle can be substituted or unsubstituted. In certain embodiments, each ring of the polycycle contains from 3 to 10 atoms in the ring, preferably from 5 to 7.

The term "sulfate" is art-recognized and refers to the group $—OSO_3H$, or a pharmaceutically acceptable salt thereof.

The term "sulfonamide" is art-recognized and refers to the group represented by the general formulae

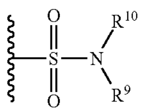 or 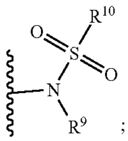 ;

wherein $R^9$ and $R^{10}$ independently represents hydrogen or hydrocarbyl.

The term "sulfoxide" is art-recognized and refers to the group $—S(O)_1—$.

The term "sulfonate" is art-recognized and refers to the group $SO_3H$, or a pharmaceutically acceptable salt thereof.

The term "sulfone" is art-recognized and refers to the group $—S(O)_2—$.

The term "substituted" refers to moieties having substituents replacing a hydrogen on one or more carbons of the backbone. It will be understood that "substitution" or "substituted with" includes the implicit proviso that such substitution is in accordance with permitted valence of the substituted atom and the substituent, and that the substitution results in a stable compound, e.g., which does not spontaneously undergo transformation such as by rearrangement, cyclization, elimination, etc. As used herein, the term "substituted" is contemplated to include all permissible substituents of organic compounds. In a broad aspect, the permissible substituents include acyclic and cyclic, branched and unbranched, carbocyclic and heterocyclic, aromatic and non-aromatic substituents of organic compounds. The permissible substituents can be one or more and the same or different for appropriate organic compounds. For purposes of this invention, the heteroatoms such as nitrogen may have hydrogen substituents and/or any permissible substituents of organic compounds described herein which satisfy the valences of the heteroatoms. Substituents can include any substituents described herein, for example, a halogen, a hydroxyl, a carbonyl (such as a carboxyl, an alkoxycarbonyl, a formyl, or an acyl), a thiocarbonyl (such as a thioester, a thioacetate, or a thioformate), an alkoxyl, a phosphoryl, a phosphate, a phosphonate, a phosphinate, an amino, an amido, an amidine, an imine, a cyano, a nitro, an azido, a sulfhydryl, an alkylthio, a sulfate, a sulfonate, a sulfamoyl, a sulfonamido, a sulfonyl, a heterocyclyl, an aralkyl, or an aromatic or heteroaromatic moiety. It will be understood by those skilled in the art that the moieties substituted on the hydrocarbon chain can themselves be substituted, if appropriate.

The term "thioalkyl", as used herein, refers to an alkyl group substituted with a thiol group.

The term "thioester", as used herein, refers to a group $—C(O)SR^9$ or $—SC(O)R^9$ wherein $R^9$ represents a hydrocarbyl.

The term "thioether", as used herein, is equivalent to an ether, wherein the oxygen is replaced with a sulfur.

The term "urea" is art-recognized and may be represented by the general formula

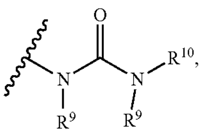

wherein $R^9$ and $R^{10}$ independently represent hydrogen or a hydrocarbyl.

The term "modulate" as used herein includes the inhibition or suppression of a function or activity (such as cell proliferation) as well as the enhancement of a function or activity.

The term "Log of solubility", "LogS" or "logS" as used herein is used in the art to quantify the aqueous solubility of a compound. The aqueous solubility of a compound significantly affects its absorption and distribution characteristics. A low solubility often goes along with a poor absorption. LogS value is a unit stripped logarithm (base 10) of the solubility measured in mol/liter.

As used herein, the term "hydrated carbon dioxide" encompasses all reaction products from the reaction of gaseous carbon dioxide with water in the presence of a catalyst, including, without limitation, carbonic acid, carbonate salts and/or ions, and bicarbonate salts and/or ions.

As used herein, the term "stable" describes the ability of a compound to exist as described under the conditions specified (e.g. temperature, concentration, pH) without substantial chemical decomposition which would alter the behavior of the compound as described by the disclosure. As a non-limiting example, "thermally stable" indicates that a given species is resistant to chemical decomposition at the temperature(s) described therein.

Catalysts for $CO_2$ Capture

In certain aspects, the present disclosure provides zinc complexes having the formula:

$(L^1)_nZn(L^2)_m$;

wherein:

each $L^1$ is a bidentate, tridentate, tetradentate, pentadentate, hexadentate, heptadentate, or octadentate ligand coordinated to Zn in at least a $\kappa^2$ fashion;

each $L^1$ is bound to Zn through at least one donor heteroatom selected from O or N;

each $L^1$ is mono-, di-, tri-, tetra-, penta-, or hexaanionic;

each $L^2$ is selected from —OH or —$OH_2$;

nis 1 or 2; and m is 0 or 1.

In certain embodiments, the complex is soluble in water and stable under basic conditions.

As will be understood by those of skill in the art, complexes according to the general formula above may be charged or neutral depending on the identity and number of $L^1$ and $L^2$, as well as the charge on the zinc fragment. For example, a zinc complex of the present disclosure may have an overall net charge of +1, 0, −1, −2, −3, −4, −5, −6, −7, −8, etc.

In certain embodiments, the zinc complex further comprises a cation, the complex having the formula:

$[\{(L^1)_nZn(L^2)_m\}w]^z[A_y]^x$ wherein:

z is the charge of the $\{(L^1)_nZn(L^2)_m\}$ fragment, and is selected from 0, −1, −2, or −3;

A is a cation;

x is the charge of the A cation, and is selected from +1 or +2;

w is an integer equal to (y·x)/z; and y is an integer equal to (w·z)/x.

In certain embodiments, the cation is selected from ammonium, lithium, sodium, potassium, cesium, calcium, or magnesium. In further embodiments, the cation is ammonium. In yet further embodiments, the cation is lithium. In still further embodiments, the cation is sodium. In certain embodiments, the cation is potassium. In further embodiments, the cation is cesium. In yet further embodiments, the cation is calcium. In still further embodiments, the cation is magnesium.

In certain embodiments, $L^1$ is not a cyclen or porphyrin ligand. In further embodiments, $L^1$ is selected from ethylenediaminetetraacetic acid (EDTA), glutaric acid, nitrilotriacetic acid, triazacyclononane, trispyrazolylborate, terpyridine, porphine, corrin, tris(2-aminoethyl)amine, triethylenetetramine, 12-crown-4, 15-crown-5, 16-crown-6, (2,2,2)cryptand, glycine, salen, 2-(pyridine-2-yl)propan-2-ol, niacin, picolinic acid, 2-acetylpyridine, iminodiacetic acid, oxalate, glutaric acid, ethylene glycol-bis(ß-aminoethyl ether)-N,N,N',N'-tetraacetic acid (EGTA), diethylenetriaminepentaacetic acid, or ethylenediamine-N,N'-bis(2-hydroxyphenylacetic acid) (EDDHA), each of which may be optionally substituted by one or more substituents independently selected from H, OH, amino, imine, sulfate, sulfonyl, alkyl, heteroalkyl, alkoxy, aryl, heteroaryl, cycloalkyl, heterocycloalkyl, acetyl, carboxylate, or glycolate.

In yet further embodiments, $L^1$ is a ligand of Formula $L^{1A}$, $L^{1B}$, $L^{1C}$, or $L^{1D}$:

$L^{1A}$

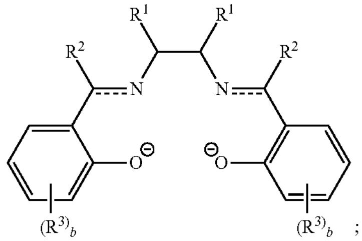

;

$L^{1B}$

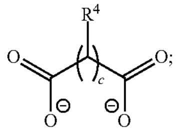

$L^{1C}$

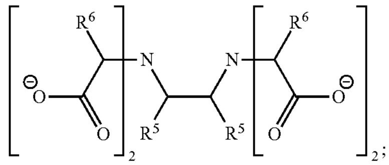

; or $L^{1D}$

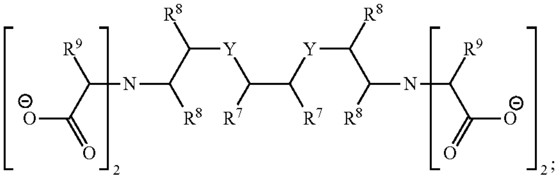

;

wherein each $R^1$, $R^2$, $R^3$, $R^4$, $R^5$, $R^6$, $R^7$, $R^8$, and $R^9$ is, independently at each occurrence, selected from H, OH, amino, imine, sulfate, sulfonyl, alkyl, heteroalkyl, alkoxy, aryl, heteroaryl, cycloalkyl, heterocycloalkyl, acetyl, carboxylate, glycolate;

Y is NH, S, or O;

b is, independently at each occurrence, an integer from 0-4;

c is, independently at each occurrence, an integer from 0-3; and

=== is a single or double bond.

In certain embodiments, $L^1$ is selected from:

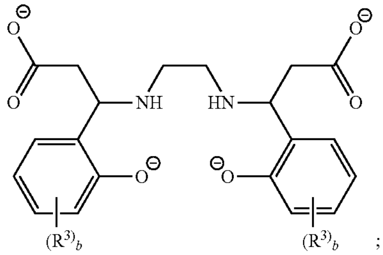

;

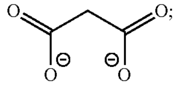

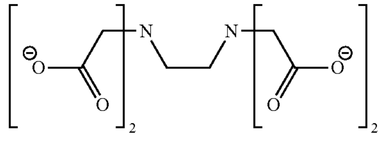

; or

-continued

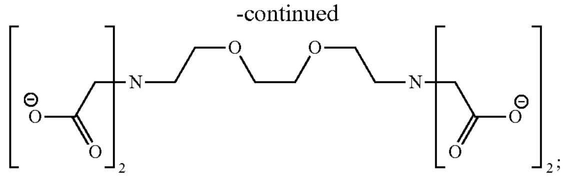

In certain embodiments, the complex is stable at a pH from about 7 to about 16. In further embodiments, the complex is stable at a pH from about 8 to about 10. In yet further embodiments, the complex is stable at a pH of about 8. In still further embodiments, the complex is stable at a pH of about 9. In certain embodiments, the complex is stable at a pH of about 10.

Methods of $CO_2$ Capture

In certain aspects, the present disclosure describes a method of capturing carbon dioxide from a gas feed stream, comprising contacting the gas feed stream with a solution of a zinc complex in water and optionally a co-solvent to react the carbon dioxide with water to form a solution of hydrated carbon dioxide; wherein the zinc complex comprises at least one ligand coordinated to zinc. In further embodiments, the zinc complex is homogeneous. In yet further embodiments, the co-solvent is selected from ethanolamine, propylene carbonate, or an ionic liquid.

In certain embodiments, the at least one ligand is a bidentate, tridentate, tetradentate, pentadentate, hexadentate, heptadentate, or octadentate ligand coordinated to zinc in at least a κ2 fashion. In further embodiments, the at least one ligand is not a cyclen or porphyrin ligand. In yet further embodiments, the homogeneous zinc complex is a zinc complex as described herein.

In certain embodiments, the solution of a homogeneous zinc complex further comprises a salt. In further embodiments, the salt is a carbonate salt. In yet further embodiments the salt is potassium carbonate. In still further embodiments, the salt is present in the solution in an amount of about 0.001 M to about 20 M. In certain embodiments, the homogeneous zinc complex is present in the solution in an amount of about 0.00001 M to about 10 M.

In certain embodiments, the method is carried out at a temperature from about 20° C. to about 50° C. In further embodiments, the pH of the solution is from about 7 to about 16. In still embodiments, the pH of the solution is from about 8 to about 10. In certain embodiments, the method further comprises releasing gaseous carbon dioxide from the solution. In further embodiments, releasing gaseous carbon dioxide from the solution comprises heating the solution of hydrated carbon dioxide is heated to a temperature from about 50° ° C. to about 200° C. In yet further embodiments, the solution of hydrated carbon dioxide is heated to a temperature of about 80° C. In still further embodiments, releasing gaseous carbon dioxide from the solution comprises decreasing the pressure. In certain embodiments, the pressure is decreased to a pressure in the range of about 0.1 mTorr to about 760 Torr. In further embodiments, releasing gaseous carbon dioxide from the solution comprises a change in chemical potential. In yet further embodiments, the change in chemical potential comprises an increase in relative humidity.

In certain embodiments, the gas feed stream is air.

Apparatuses for $CO_2$ Capture

In certain aspects the present disclosure describes an apparatus for carbon dioxide capture comprising a solution of a zinc complex in water and optionally a co-solvent; wherein the zinc complex comprises at least one ligand coordinated to zinc.

In certain embodiments, the at least one ligand is a bidentate, tridentate, tetradentate, pentadentate, hexadentate, heptadentate, or octadentate ligand coordinated to zinc in at least a κ2 fashion. In further embodiments, the at least one ligand is not a cyclen or porphyrin ligand. In yet further embodiments the zinc complex is a zinc complex as described herein.

In certain embodiments, the solution of a homogeneous zinc complex further comprises a salt. In further embodiments, the salt is a carbonate salt. In yet further embodiments the salt is potassium carbonate. In still further embodiments, the salt is present in the solution in an amount of about 0.001 M to about 20 M. In certain embodiments, the homogeneous zinc complex is present in the solution in an amount of about 0.00001 M to about 10 M.

In certain embodiments, the apparatus is at a temperature from about 20° C. to about 50° C. In further embodiments, the pH of the solution is from about 7 to about 16. In yet further embodiments, the pH of the solution is from about 8 to about 10.

In certain embodiments, the co-solvent is selected from ethanolamine, propylene carbonate, or an ionic liquid.

In certain embodiments, the solution of the zinc complex is homogeneous.

EXAMPLES

The invention now being generally described, it will be more readily understood by reference to the following examples which are included merely for purposes of illustration of certain aspects and embodiments of the present invention, and are not intended to limit the invention.

Example 1: General Procedure for Synthesis of Zinc Complexes

Zinc oxide (1 equiv.) and ligand (1 equiv.) are stirred in a solvent, optionally comprising potassium carbonate, and optionally with heating, until complex formation is complete. The solution is optionally concentrated, and cooled to induce precipitation. A co-solvent may be added to induce precipitation. The zinc complex is collected by vacuum filtration, optionally washed, and dried under reduced pressure, with optional heating, to obtain the final product.

Example 2: Synthesis of Zinc Glutarate (ZnGA)

Glutaric acid (129 g, 0.98 mol) was slowly added to 1.5 L of toluene, which was heated to 60° C. while vigorously stirring for 1.0 hour to partially dissolve the glutaric acid. Zinc oxide (81.3 g, 1.0 mol) was added to the suspension and the mixture was stirred at 60° C. for an additional 4.0 hours. The light blue-purple suspension was cooled down to room temperature and filtered using a vacuum filtration system, and washed with acetone three times, resulting in a light purple powder. The powder was further dried in a vacuum oven at 60° C., 20 mmHg for 24 hours, resulting in 175 g of a fluffy purple ZnGA power.

Example 3: Synthesis of Zinc Nitrilotriacetic Acid (ZnH(NTA)

Nitrilotriacetic acid (50 g, 0.26 mol) and zinc oxide (21 g, 0.26 mol) were added to 2 L of water. The resulting suspension was refluxed at 100° C. for 1.5 hours and then concentrated to 500 mL under reduced pressure. 200 mL of isopropanol was added to the solution, and the resulting suspension was further cooled down to 0° C. overnight. The resulting solid was separated by vacuum filtration and washed with 50 mL of cold isopropanol three times. This resulted in a powdery white crystal, which was further dried at 105° C. in an oven overnight which resulted in the dry crystalline ZnH(NTA), yield: 62.4 g.

Example 4: Synthesis of Potassium Zinc Nitrilotriacetate (ZnK(NTA)

Nitrilotriacetic acid (50 g, 0.26 mol), zinc oxide (21 g, 0.26 mol) and potassium carbonate (18 g, 0.13 mol) were added to 2 L of water. The resulting suspension was heated to 105° C. for 1.5 hours, then concentrated to 200 mL. 100 mL of isopropanol was added to the concentrated solution, and the resulting suspension was further cooled down to 0° C. overnight. The resulting solid was separated by vacuum filtration and washed with 50 mL of cold isopropanol three times. This resulted in a powdery white crystal, which was further dried at 105° C. in an oven overnight which resulted in the dry crystalline ZnK(NTA), yield: 65.0 g.

Example 5: General Procedure for Carbon Dioxide Hydration Catalysis

To a 50 mL potassium carbonate solution (1.0 M, 6.9 g), a zinc complex was added at a concentration of 0.1 M. Carbon dioxide was bubbled through the solution while stirring at room temperature for 15 minutes, hydrating in solution at an accelerated rate catalyzed by the zinc complex present. The resulting carbon dioxide saturated solution rested 5 minutes before being submerged into a heating bath at 80° ° C. Carbon dioxide gas was rapidly released from the solution. The carbon dioxide gas released upon heating demonstrated that these complexes increased the capacity of carbon dioxide in the solution by accelerating the kinetics for hydration and dehydration. The resulting carbon dioxide was collected and measured by volume.

TABLE 1

Activity Comparison

| Zinc Complex | 5 min. $CO_2$ evolution | 10 min. $CO_2$ evolution | 15 min. $CO_2$ evolution |
|---|---|---|---|
| None (Control) | 4.3 mL | 6.8 mL | 8.8 mL |
| ZnGA | 10.2 mL | 17.6 mL | 22.6 mL |
| ZnK(NTA) | 7.2 mL | 11.7 mL | 14 mL |
| ZnEDTA | 8 mL | 13.3 mL | 13.5 mL |

Example 6: General Procedure for Screening of Zinc Complexes to Determine Suitability for Carbon Dioxide Hydration Catalysis To a 25 mL of potassium carbonate solution (0.25 M, 0.8 g), a zinc complex was added at a concentration of 0.5 M to determine whether or not the catalyst remained homogeneous and bound to its ligands as intended, or if the presence of carbonate anions in the solution would force precipitation of the zinc in the form of insoluble zinc carbonate. The solution/suspension of zinc complex in aqueous potassium carbonate was heated to 80° C. Observation of a clear solution, indicates that the zinc is still bound to the ligand set and demonstrates stability for use as a carbon dioxide hydration catalyst. Observation of a precipitate that does not dissolve at the elevated temperature indicates the dissociation of the ligand set and formation of insoluble zinc carbonate, showing less suitability for the present application.

TABLE 2

Screening Results

| Zinc Complex | Precipitate Observed |
|---|---|
| ZnGA | Yes |
| ZnH(NTA) | No |
| ZnK(NTA) | No |
| ZnEDTA | No |

INCORPORATION BY REFERENCE

All publications and patents mentioned herein are hereby incorporated by reference in their entirety as if each individual publication or patent was specifically and individually indicated to be incorporated by reference. In case of conflict, the present application, including any definitions herein, will control.

EQUIVALENTS

While specific embodiments of the subject invention have been discussed, the above specification is illustrative and not restrictive. Many variations of the invention will become apparent to those skilled in the art upon review of this specification and the claims below. The full scope of the invention should be determined by reference to the claims, along with their full scope of equivalents, and the specification, along with such variations.

We claim:

1. A method of capturing carbon dioxide from a gas feed stream, comprising contacting the gas feed stream with a solution of a zinc complex in water and optionally a co-solvent to react the carbon dioxide with water to form a solution of hydrated carbon dioxide; and releasing gaseous carbon dioxide from the solution, wherein the zinc complex comprises at least one ligand coordinated to zinc.

2. The method of claim 1, wherein releasing gaseous carbon dioxide from the solution comprises heating the solution of hydrated carbon dioxide.

3. The method of claim 2, wherein the solution of hydrated carbon dioxide is heated to a temperature from about 50° C. to about 200° C.

4. The method of claim 1, wherein releasing gaseous carbon dioxide from the solution comprises decreasing the pressure.

5. The method of claim 4, wherein the pressure is decreased to a pressure in the range of about 0.1 mTorr to about 760 Torr.

6. The method of claim 1, wherein releasing gaseous carbon dioxide from the solution comprises a change in chemical potential.

7. The method of claim 6, wherein the change in chemical potential comprises an increase in relative humidity.

8. The method of claim 1, wherein the gas feed stream is air.

9. The method of claim 1, wherein the co-solvent is selected from ethanolamine, propylene carbonate, or an ionic liquid.

* * * * *